(12) United States Patent
Ko et al.

(10) Patent No.: US 12,299,119 B2
(45) Date of Patent: May 13, 2025

(54) EVENT-TRIGGERED FORENSICS CAPTURE

(71) Applicant: Microsoft Technology Licensing, LLC, Redmond, WA (US)

(72) Inventors: Shi Min Sharon Ko, Redmond, WA (US); Vidhi Agarwal, Bellevue, WA (US); Gueorgui Chkodrov, Redmond, WA (US); Sangeetha Madderla, Redmond, WA (US); Mohamed Rouatbi, Yakima, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 17/745,477

(22) Filed: May 16, 2022

(65) Prior Publication Data

US 2023/0367871 A1 Nov. 16, 2023

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

| | | |
|---|---|---|
| 2003/0225769 A1 | 12/2003 | Chkodrov et al. |
| 2003/0225820 A1 | 12/2003 | Chkodrov et al. |
| 2005/0071243 A1 | 3/2005 | Somasekaran et al. |
| 2005/0071320 A1 | 3/2005 | Chkodrov et al. |
| 2005/0071341 A1 | 3/2005 | Chkodrov et al. |
| 2005/0086644 A1 | 4/2005 | Chkodrov et al. |
| 2005/0144185 A1 | 6/2005 | Chkodrov et al. |
| 2005/0144191 A1 | 6/2005 | Chkodrov et al. |
| 2005/0144192 A1 | 6/2005 | Chkodrov et al. |

(Continued)

OTHER PUBLICATIONS

Phil Tobin, "EFI Analytics TunerStudio: Automatic Logging", retrieved from <<http://www.tunerstudio.com/index.php/tuner-studio/tsarticles/93-automatic-logging>>, no later than Mar. 25, 2022, 4 pages.

(Continued)

*Primary Examiner* — Joseph P Hirl
*Assistant Examiner* — Hassan Saadoun
(74) *Attorney, Agent, or Firm* — Ogilvie Law Firm

(57) ABSTRACT

Event-triggered forensics capture technologies balance security incident data availability against data processing and storage costs. A forensic correlation engine receives basic status data of a monitored computing system. A forensic computing system detects a trigger event in the basic status data, and starts capturing extended status data per a corresponding capture specification. Captured data is submitted to a forensic analysis tool. Different trigger events may cause different data captures. A query specifying which data to capture from a live stream or from virtual machines may operate as a capture trigger start event. Extended status data capture activity may be stopped by a change in the basic status data being received, by a timeout, or by forensic analysis that finds no vulnerability or threat based on captured data. Data transfers and storage may be restricted to comply with privacy regulations or policies.

20 Claims, 3 Drawing Sheets

(56) References Cited

U.S. PATENT DOCUMENTS

| | | |
|---|---|---|
| 2005/0149475 A1 | 7/2005 | Chkodrov et al. |
| 2006/0190433 A1 | 8/2006 | Chkodrov et al. |
| 2006/0224400 A1 | 10/2006 | Chkodrov et al. |
| 2006/0241959 A1 | 10/2006 | Chkodrov et al. |
| 2006/0265365 A1 | 11/2006 | Chkodrov et al. |
| 2006/0265406 A1 | 11/2006 | Chkodrov et al. |
| 2006/0282695 A1 | 12/2006 | Mital et al. |
| 2007/0150585 A1 | 6/2007 | Chkodrov et al. |
| 2007/0244735 A1 | 10/2007 | Mital et al. |
| 2007/0244910 A1 | 10/2007 | Mital et al. |
| 2008/0072221 A1 | 3/2008 | Chkodrov et al. |
| 2008/0294384 A1* | 11/2008 | Fok .................. G06F 11/30 702/187 |
| 2009/0055838 A1* | 2/2009 | Sedukhin ........... G06F 11/3612 719/318 |
| 2009/0132671 A1 | 5/2009 | Chkodrov et al. |
| 2009/0132868 A1 | 5/2009 | Chkodrov et al. |
| 2009/0133038 A1 | 5/2009 | Chkodrov et al. |
| 2009/0133039 A1 | 5/2009 | Chkodrov et al. |
| 2009/0024622 A1 | 6/2009 | Chkodrov et al. |
| 2009/0307533 A1 | 12/2009 | Niikkonen et al. |
| 2010/0131543 A1 | 5/2010 | Chkodrov et al. |
| 2010/0223446 A1 | 9/2010 | Katariya et al. |
| 2010/0268808 A1 | 10/2010 | Chkodrov et al. |
| 2010/0316987 A1 | 12/2010 | Charlson et al. |
| 2010/0318589 A1 | 12/2010 | Wang et al. |
| 2010/0318657 A1 | 12/2010 | Charlson et al. |
| 2011/0185338 A1 | 7/2011 | Mital et al. |
| 2012/0323941 A1 | 12/2012 | Chkodrov et al. |
| 2013/0014094 A1 | 1/2013 | Chkodrov et al. |
| 2015/0113130 A1* | 4/2015 | Chambliss ............. H04L 43/10 709/224 |
| 2015/0143271 A1 | 5/2015 | Sanders et al. |
| 2016/0028704 A1 | 1/2016 | Rouatbi et al. |
| 2016/0087963 A1 | 3/2016 | Rouatbi et al. |
| 2017/0223052 A1* | 8/2017 | Stutz .................. H04L 63/1491 |
| 2017/0280420 A1* | 9/2017 | Brennan ............... H04W 16/28 |
| 2017/0346809 A1* | 11/2017 | Plotnik ................ H04L 63/123 |
| 2018/0285396 A1 | 10/2018 | Chkodrov et al. |
| 2018/0329792 A1 | 11/2018 | Chkodrov et al. |
| 2019/0065754 A1 | 2/2019 | Ochs et al. |
| 2019/0098024 A1 | 3/2019 | Gaivoronski et al. |
| 2019/0104147 A1 | 4/2019 | Rouatbi et al. |
| 2019/0205185 A1 | 7/2019 | Alfred et al. |
| 2019/0243913 A1 | 8/2019 | Chkodrov et al. |
| 2019/0258734 A1 | 8/2019 | Chkodrov et al. |
| 2020/0218800 A1* | 7/2020 | Sun ....................... G06F 21/552 |
| 2020/0252417 A1 | 8/2020 | Neuvirth et al. |
| 2020/0336505 A1 | 10/2020 | Neuvirth et al. |
| 2021/0044606 A1 | 2/2021 | Neuvirth et al. |
| 2021/0051082 A1 | 2/2021 | Hollis et al. |
| 2021/0311542 A1 | 10/2021 | Brown et al. |

OTHER PUBLICATIONS

"AutoCombatLogger", retrieved from <<https://www.curseforge.com/wow/addons/autocombatlogger>>, no later than Mar. 25, 2022, 10 pages.

"What can cause the close event to be not be called when exiting an application", retrieved from <<https://stackoverflow.com/questions/19689509/what-can-cause-the-close-event-to-be-not-be-called-when-exiting-an-application>>, Oct. 30, 2013, 2 pages.

"Start Conditions Page", retrieved from <<https://documentation.help/NI-LabVIEW-SignalExpress/Start_Conditions.html>>, no later than Mar. 25, 2022, 20 pages.

Adam Bertram, "How to Set Up Monitoring to Alert on Windows High System Usage", retrieved from <<https://www.cloudsavvyit.com/3931/how-to-set-up-monitoring-to-alert-on-windows-high-system-usage/>>, Apr. 6, 2020, 16 pages.

"Using Microsoft Defender For Endpoint During Investigation", retrieved from <<https://m365internals.com/2021/05/14/using-microsoft-defender-for-endpoint-during-investigation/>>, May 14, 2021, 20 pages.

Mike Cohen, "Event Tracing For Windows", retrieved from <<https://velociraptor.velocidex.com/event-tracing-for-windows-41eb031abd69>>, Sep. 3, 2021, 9 pages.

Matthieu Maitre, "Streaming Netflow to Azure Sentinel and Kusto", retrieved from <<http://mmaitre314.github.io/2021/05/30/streaming-netflow-to-azure-sentinel-and-kusto.html>>, no later than May 6, 2022, 5 pages.

"Microsoft/RxKql", retrieved from <<https://github.com/microsoft/RxKql>>, Sep. 24, 2021, 3 pages.

"International Search Report and Written Opinion Issued in PCT Application No. PCT/US23/019183", Mailed Date: Jul. 20, 2023, 13 Pages.

* cited by examiner

EVENT-TRIGGERED FORENSICS CAPTURE

BACKGROUND

Attacks on a computing system may take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within the computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made against a computing system. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place. Some defenses might not be feasible or cost-effective for the computing system. However, improvements in cybersecurity remain possible, and worth pursuing.

SUMMARY

Some embodiments described herein address technical challenges related to cybersecurity by providing or utilizing an event-triggered forensic capture functionality that dynamically adapts status data capture to changing circumstances. Status data may include activity data, health status data, logged data, captured packet data, or other data indicative of activities or circumstances in a monitored computing system.

In some embodiments or in their operational context, a correlation engine receives basic status data of a monitored computing system which is at least partially external to a forensic computing system. A forensic specification includes a trigger event specification and a capture specification. During event-triggered forensics capture, an embodiment detects a trigger event in the basic status data; the trigger event matches the trigger event specification. In response to detecting the trigger event, the embodiment starts a forensic capture of extended status data from the monitored computing system. The extended status data includes data which is not present in the basic status data and which matches the capture specification. During or after the forensic capture, the embodiment submits at least a portion of the extended status data to a forensic analysis tool.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
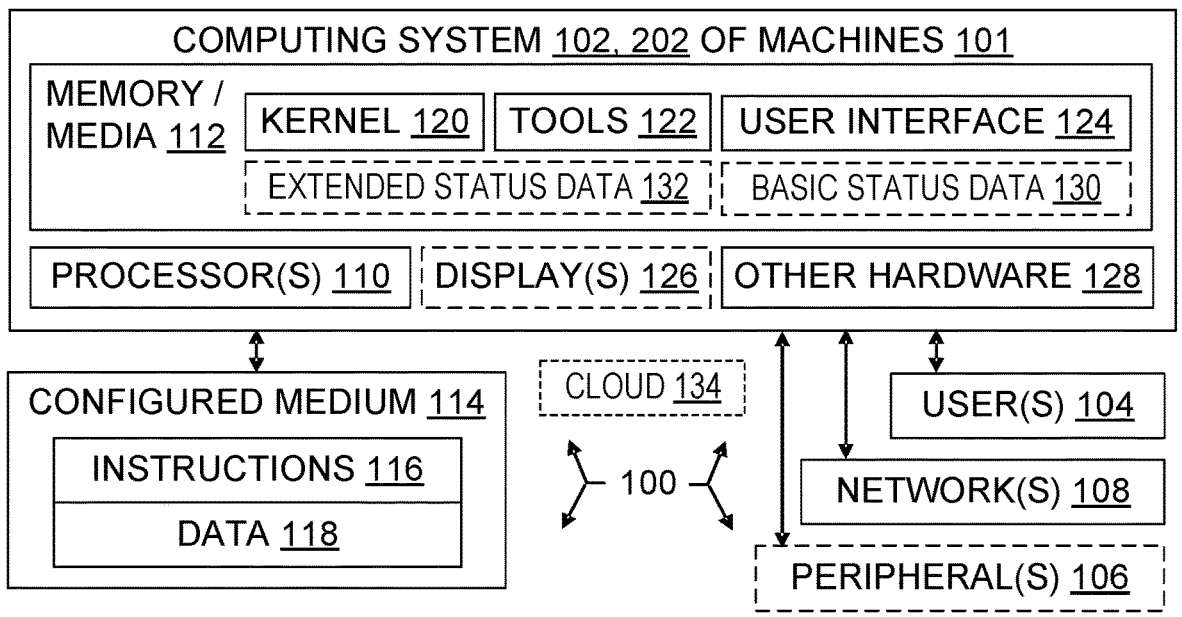
FIG. 1 is a diagram illustrating aspects of computer systems and also illustrating configured storage media.

Innovations may expand beyond their origins, but understanding an innovation's origins can help one more fully appreciate the innovation. In the present case, some teachings described herein were motivated by technical challenges arising from ongoing efforts by Microsoft innovators to help customers safely manage storage costs in a cloud. However, the teachings presented here may also be applied beneficially to other computing environments, such as on-premise networks and hybrid local-cloud networks.

Microsoft innovators recognized that as a business and its infrastructure grow, network monitoring becomes exponentially challenging. They identified challenges such as how to maintain uncompromised visibility of data in a scalable and practical way, and how to better integrate network monitoring into security suites and tools, including cloud SIEMs.

Microsoft innovators explored various ways to address technical challenges related to cybersecurity, such as how to automatically balance security data storage costs and data processing costs against benefits of having specific activity data during an incident investigation, how to specify events of particular interest, and how to leverage forensic analysis tools. At one extreme, logging or otherwise recording every action performed in a system would maximize the security data that would subsequently be available for analysis during an incident investigation, e.g., data that is useful to help identify threats, vulnerabilities, or tactics and techniques used by attackers. However, recording an action slows system performance, and also consumes storage. Toward the other extreme, recording fewer actions would reduce the performance impact and the data storage costs, but would also hinder incident investigation by reducing the evidence available for analysis.

Some embodiments described herein address these technical challenges by providing or utilizing an event-triggered forensic capture functionality that dynamically adapts data capture to changing circumstances. In some embodiments or their context, a correlation engine receives basic status data of a monitored computing system which is at least partially external to a forensic computing system. In some variations, the monitored computing system which is at least partially external to a forensic computing system but different kinds of data are still captured in response to a trigger, i.e., extended status data 132 is different in kind or scope or detail level from basic status data 130.

In some examples, a forensic specification includes a trigger event specification and a capture specification. During event-triggered forensics capture, an embodiment detects a trigger event in the basic status data; the trigger event matches the trigger event specification. The trigger event specification may specify a single event, or may specify a condition based on multiple machines 101 or multiple events 214 or both. In response to detecting the trigger event, the embodiment starts a forensic capture of extended status data from the monitored computing system. The extended status data includes data which is not present in the basic status data and which matches the capture specification. The embodiment submits at least a portion of the extended status data to a forensic analysis tool.

Accordingly, the embodiment does not attempt to capture all potentially helpful activity data. Nor does the embodiment simply abandon any effort to capture more than basic data that would have some (limited) utility in most incidents. Instead, the embodiment dynamically adopts a balance between these extremes, by examining the basic data for a trigger event. When a trigger event is seen, the embodiment captures particular kinds of extended data that are likely to be helpful for an investigation which involves that kind of trigger event. The embodiment thus beneficially balances security data storage costs and data processing costs against the benefits of having specific activity data during an incident investigation, by conditioning the extended data capture on particular trigger events and their corresponding capture specifications. Events of particular interest are specified as trigger events or by their corresponding capture specifications. Forensic analysis tools are leveraged by submitting relevant data to them, as opposed to basic data. Other technical challenges, and the benefits of innovations which address them, will also be apparent to one of skill from the present disclosure.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine 101 is a computer system, and a network or other group of cooperating machines is also a computer system. An individual machine may also be called a "node". In a given SIEM installation, there may be hundreds of user-facing computer nodes 101, 102, often including two or more different operating systems 120, as well as dozens of network devices 101, 102. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. Tools 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, event-triggered forensic capture functionality could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
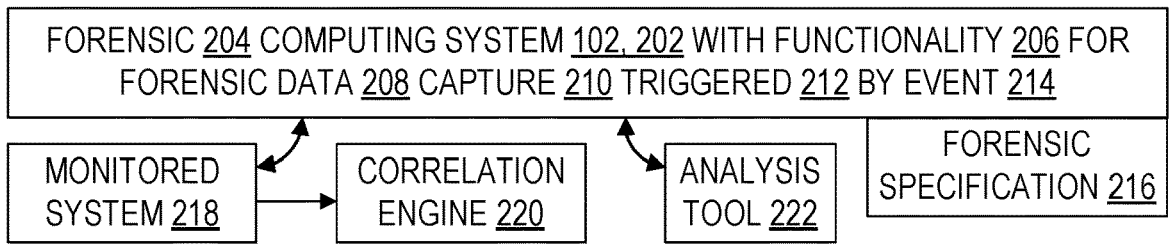
FIG. 2 is a diagram illustrating aspects of a computing system which has one or more of the event-triggered forensics capture enhancements taught herein.

FIG. 2 illustrates a computing system 102 configured by one or more of the event-triggered forensic capture enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
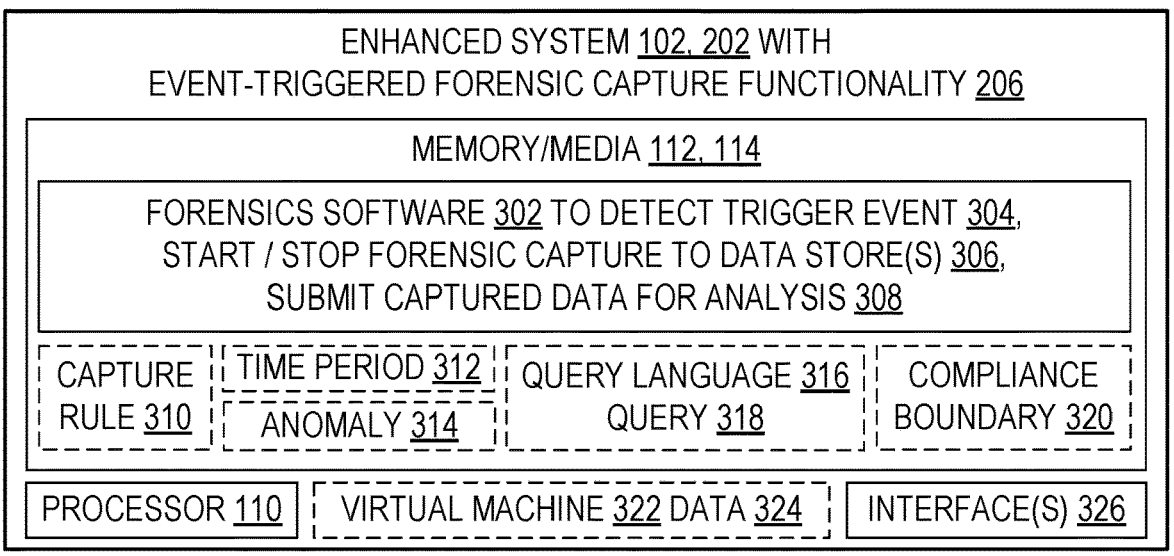
FIG. 3 is a block diagram illustrating an enhanced system configured with event-triggered forensic capture functionality.

FIG. 3 illustrates an enhanced system 202 which is configured with forensics software 302 to provide functionality 206. Software 302 and other FIG. 3 items are discussed at various points herein, and additional details regarding them are provided in the discussion of a List of Reference Numerals later in this disclosure document.

Figures 4, 5:
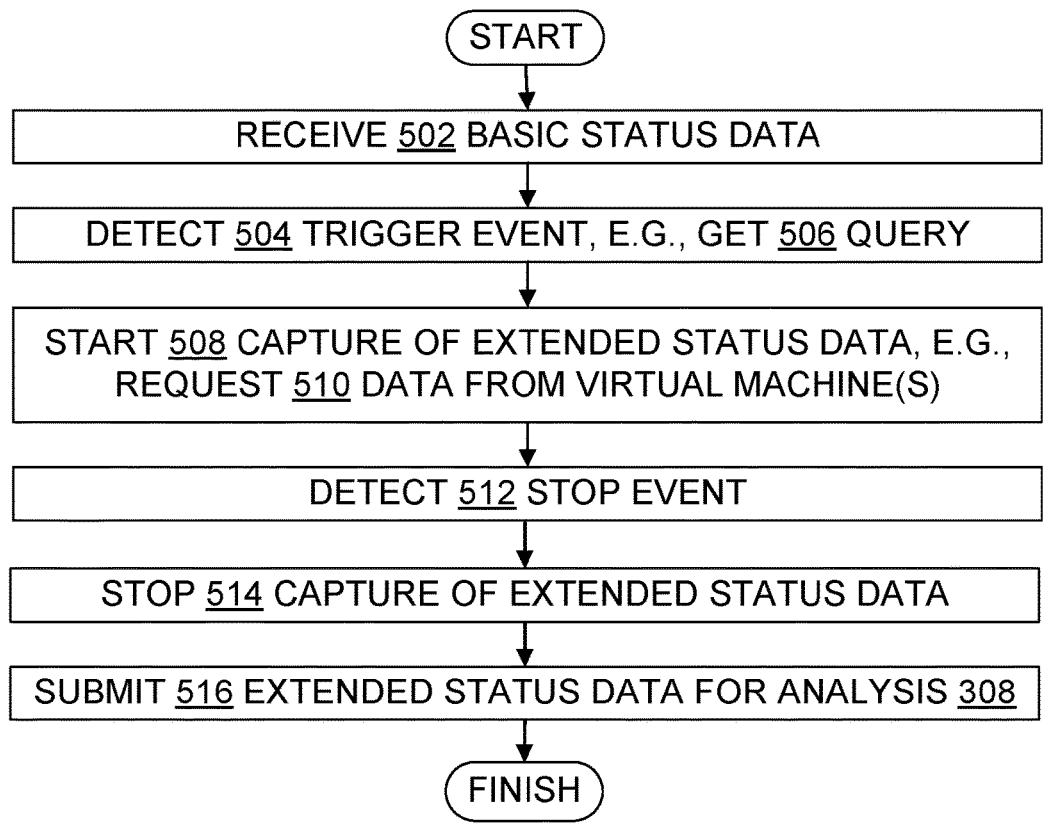
FIG. 4 is a block diagram illustrating aspects of some forensic specifications.
FIG. 5 is a flowchart illustrating steps in some methods for event-triggered forensics capture.

FIG. 4 shows aspects of some forensic specifications 216. This is not a comprehensive summary of all forensic specifications 216, or a comprehensive summary of all aspects of an environment 100 or system 202 or other context of forensic specifications 216, or a comprehensive summary of all events 214 or forensic data 208 or other data structures or other mechanisms for potential use in or with a system 102 or 202. FIG. 4 items are discussed at various points herein, and additional details regarding them are provided in the discussion of a List of Reference Numerals later in this disclosure document.

In some embodiments, the enhanced system 202 may be networked through an interface 326. An interface 326 may include hardware such as network interface cards, software such as network stacks, APIs, or sockets, combination items such as network connections, or a combination thereof.

In some embodiments, an enhanced system 202 includes a computing system 202 which is configured to perform event-triggered forensic capture 210. The enhanced system 202 includes a digital memory 112 and a processor 110 in operable communication with the memory. In a given embodiment, the digital memory 112 may be volatile or nonvolatile or a mix.

In one example, the enhanced system 202 includes a digital data store 306, which includes some memory 112. In a variation shown in FIG. 7, a system 202 includes two digital data stores 306, namely, a basic data store 704, 306 and an extended data store 706, 306.

In this example, the enhanced system 202 includes a correlation engine interface 326 to a correlation engine 220. The correlation engine interface is configured for the correlation engine 220 to receive basic status data 130 of a monitored computing system 218, 102. The correlation engine 220 may perform ongoing or continuous cybersecurity correlation 708 of status data 130 from multiple machines 101 of a monitored computing system 218.

Notably, the monitored computing system 218 is at least partially external to the forensic computing system 202. This distinction beneficially distinguishes these embodiments from local-only approaches that analyze a machine X's status on that same machine X using only knowledge that is local to that same machine X, because those local-only approaches do not involve a monitored computing system which is at least partially external to the forensic computing system. The local-only approaches, for example, do not correlate data from multiple machines. Thus, local-only approaches do not reliably detect lateral movement, or reliably detect attacks which involve coordinated action across multiple machines while avoiding activity on any given machine that is sufficient to raise an alert on that machine in isolation. Enhanced systems 202 need not have these local-only shortcomings.

In this example, the enhanced system 202 includes a forensic specification 216, e.g., a data structure which includes at least a trigger event specification 402 and a capture specification 404. The trigger event specification 402 specifies when to start capturing 210 extended status data 132 that matches the capture specification 404. The forensic specification 216 may also include a stop event specification 408 to expressly specify when to stop capturing 210 extended status data 132 that matches the capture specification 404. Alternately, the stop state may be implicit, e.g., specified 408 in software instructions 116 as opposed to a distinct data structure.

In this example, the enhanced system 202 includes a processor 110 configured to perform steps that execute event-triggered forensic capture. This includes: (a) detecting 504 a trigger event 304 in the basic status data 130, the trigger event matching 616 the trigger event specification 402, (b) in response to detecting the trigger event, starting 508 a forensic capture 210 of extended status data 132 from the monitored computing system 218, the extended status data 132 including data 118 which is not present in the basic status data 130 and which matches 616 the capture specification 404, and (c) submitting 516 at least a portion of the captured extended status data 132 to a forensic analysis tool 222.

In this example, the status data 208 includes data from log analytics, packet captures, SIEM, etc. Basic status data 130, 208 is the ongoing or continuous data collected, e.g., per step A in FIG. 7, whereas extended status data 132 is the additional forensic data captured in response to the event trigger, e.g., per step E in FIG. 7. A forensic specification 216 is or provides a mapping from a trigger event 304 to the forensic data corresponding to that trigger event, namely the data 132 to capture. For instance, a transmit event 304 to an unrecognized or known malicious IP address might trigger capture of packets 132 transmitted to or from that IP address, whereas a delete log event 304 by a user on a machine might trigger capture of all subsequent activity 208 on that machine or by that user or both. The trigger event 304 is defined in the trigger event specification 402 and its corresponding extended forensic data 132 is defined in the trigger's corresponding capture specification 404. The forensic analysis tool 222 may be a SIEM, an antivirus tool, a malware detection tool, an intrusion detection tool, an exfiltration examination tool, a packet examination tool, or any other tool 122 that is capable of being used to examine captured data 208 to help identify a security risk or a security breach.

In some embodiments, the data store 306 includes a basic status data store 704 to hold basic status data 130 and an extended status data store 706 to hold extended status data 132. For example, the extended status data store 706 may have greater latency but lower cost per megabyte than the basic status data store 704.

In some embodiments, the forensic specification 216 also includes a stop event specification 408, and the forensic computing system 202 is configured to detect 512 a stop event 406 which matches 616 the stop event specification 408. In response to detecting the stop event, this example embodiment stops 514 the forensic capture 210 of extended status data 132 from the monitored computing system 218.

The stop event 406 may be, e.g., a timeout 414, 406, or a basic status data collection condition 412 change 406, or another event 214, 406.

As a timeout example, suppose the trigger event is a login by a user who has been inactive for at least ten days, and the extended data 132 captured is all activity by that user. Then the stop event could be a timeout set to occur forty-eight hours after the most recent activity by that user.

As a collection condition 412 change example, suppose the trigger event is a correlation of logins at two machines which are geographically distant from one another, by the same account and within a five-minute period. Then the stop event 406 could be an account lockout imposed by a security tool on both machines.

An example of another kind of stop event 406 would be a result from the forensic analysis tool 222 indicating that the analysis of captured data 132 did not reveal any anomaly 314. For instance, suppose analysis of captured data 132 indicates that captured traffic data did not show any beaconing activity, large packet sizes, or anomalous destination ports. This could generate a no-anomaly-found stop event 416, 406.

In some circumstances, a receipt rate 410 of extended data 132 capture might be a lot more than a receipt rate 410 of ongoing basic data 130 capture. The forensic data 208 "receipt rate" is measured as the larger of: events per time period, or bytes per time period. In some embodiments, a receipt rate 410 of extended status data 132 is at least ten times a receipt rate 410 of basic status data 130 over a given time period 312 of the forensic capture 210. This would include situations in which the extended events 132 per time period is at least 10× the regular events 130 per time period, or the size 426 of extended data 132 per time period is at least 10× the size 426 of regular events 130 per time period, or both.

In some embodiments, each trigger event 304 can have its own respective definition 404 of forensic data 208 to capture in response to that trigger event 304. Capture specifications 404 may differ in various ways, e.g., one specification's data may overlap another one's data, or one specification's data might be a subset of another one's data, or there might not be any overlap.

In some embodiments, the forensic specification 216 includes multiple trigger event specifications 402 and multiple corresponding capture specifications 404, and at least two of the capture specifications 404 specify different extended status data 132 than each other.

These example scenarios are illustrative, not comprehensive. One of skill informed by the teachings herein will recognize that many other scenarios and many other variations are also taught. In particular, different embodiments or configurations may vary as to the particular trigger events 304, specification 402 or 404 or 408 data structures (regular expressions, parsing templates, objects, table entries, etc.), ratios of receipt rates 410 for extended versus basic data, forensic tools 222, user interfaces 124, or time periods, for example, and yet still be within the scope of the teachings presented in this disclosure.

Other system embodiments are also described herein, either directly or derivable as system versions of described processes or configured media, duly informed by the extensive discussion herein of computing hardware.

Although specific event-triggered forensic capture architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. For example, a given embodiment may include additional or different data structure implementations (using linked lists, trees, objects, pointers, tables, arrays, etc.), as well as different technical features, aspects, security controls, mechanisms, criteria, expressions, hierarchies, operational sequences, environment or system characteristics, or other forensic capture functionality teachings noted herein, and may otherwise depart from the particular illustrative examples provided.

Processes (a.k.a. Methods)

Figure 6:
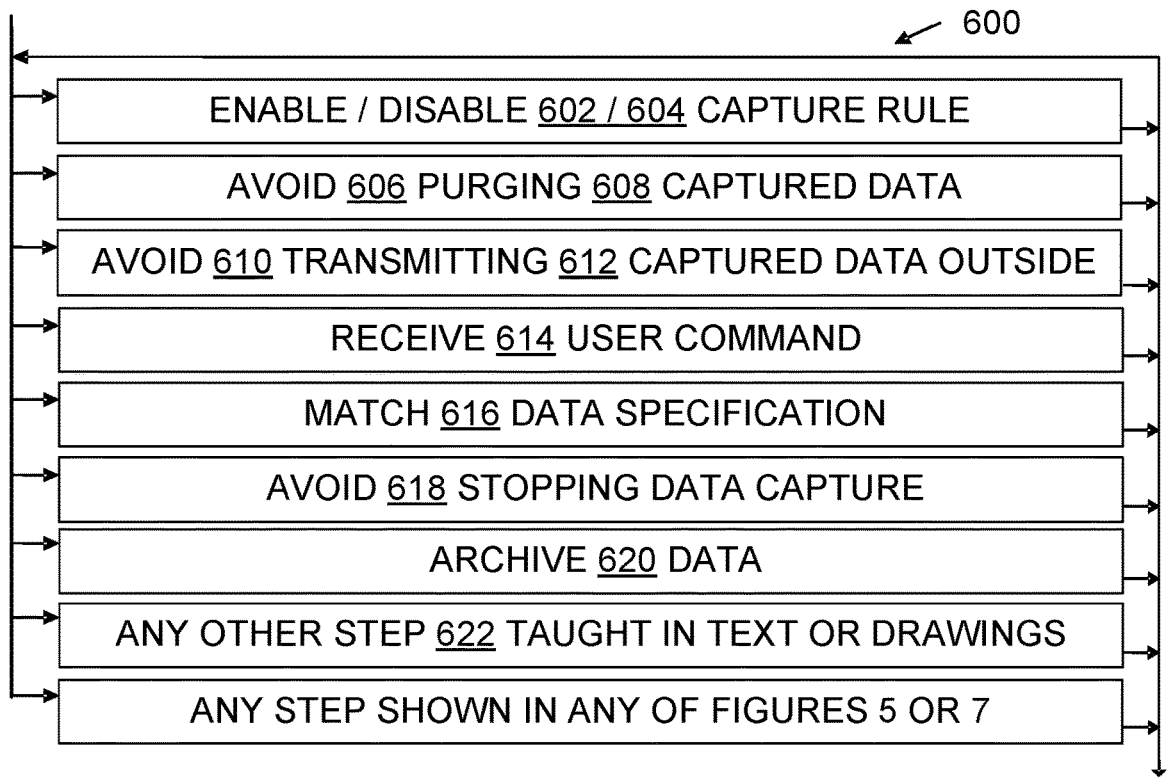
FIG. 6 is a flowchart further illustrating steps in some event-triggered forensics capture methods, incorporating the steps shown expressly or implicitly in FIGS. 5 and 7.
Figure 7:
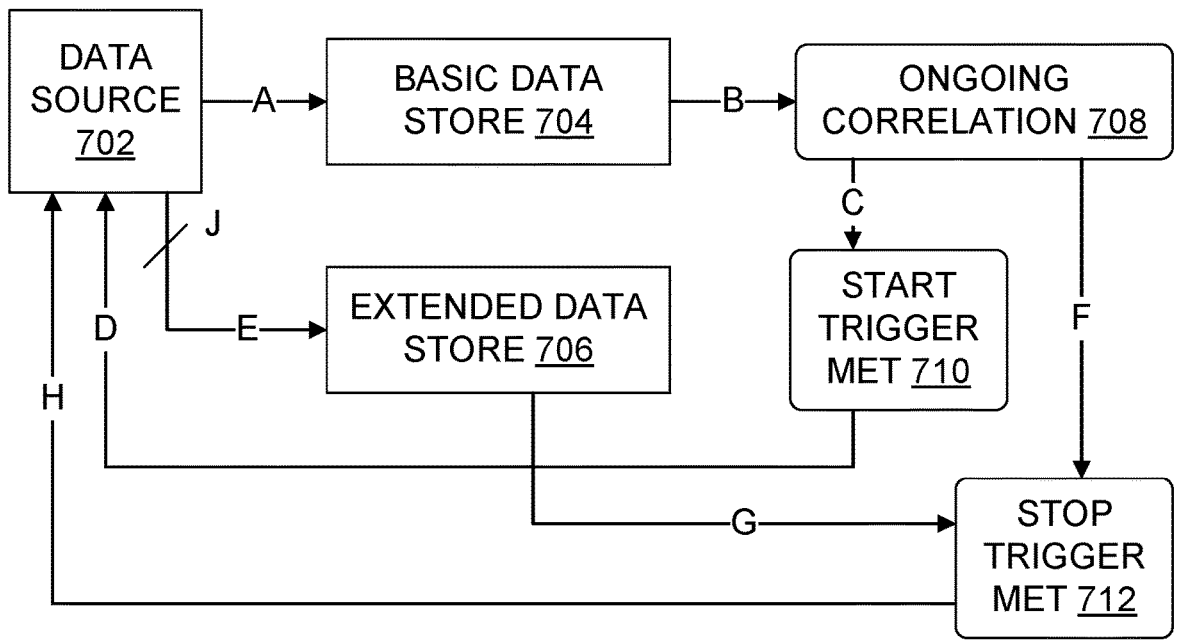
FIG. 7 is a data flow diagram illustrating an event-triggered forensics capture architecture.

Methods (which may also be referred to as "processes" in the legal sense of that word) are illustrated in various ways herein, both in text and in drawing figures. FIG. 5 illustrates a family of methods 500 that may be performed or assisted by an enhanced system, such as system 202 or another event-triggered forensic capture functionality enhanced system as taught herein. FIG. 7 shows an event-triggered forensic capture architecture with implicit or explicit actions, e.g., steps for collecting data, transferring data, storing data, and otherwise processing data. FIG. 6 includes some refinements, supplements, or contextual actions for steps illustrated by FIGS. 5 and 7, and incorporates the steps of those Figures as options.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may type in a value for the system 202 to use as a timeout event 414 time period 312. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIGS. 5 and 6. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 600 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments provide or utilize a method 500 for event-triggered forensics capture, the method performed (executed) by a forensic computing system 202, the method including: receiving 502 basic status data 130 of a monitored computing system 218 which includes multiple machines 101 outside the forensic computing system; detecting 504 a trigger event 304 in the basic status data, the trigger event matching 616 a trigger event specification 402; in response to detecting the trigger event, starting 508 a forensic capture 210 of extended status data 132 of the monitored computing system, the extended status data including data 118 which is not present in the basic status data 130 and which matches 616 a capture specification 404 that is associated with the trigger event specification; detecting 512 a stop event 406, the stop event matching 616 a predefined stop event specification 408; in response to detecting the stop event 406, stopping 514 the forensic capture of extended status data of the monitored computing system without 618 stopping an ongoing receipt 502 of basic status data; and submitting 516 at least a portion of the extended status data to a forensic analysis tool for analysis 308.

In some embodiments, the method includes the forensic computing system getting 506 a query 318 in a query language 316, the query including the trigger event specification 402 and the query including the capture specification 404.

In some embodiments, the stop event 406 is a timeout event 414. In some situations, the timeout event occurs after a predefined amount of time 312, regardless of input data 208.

In some embodiments, the stop event 406 includes a change 428 in whether the basic status data satisfies a collection condition 412. For example, one scenario includes the following sequence:

Status data 130==CPU utilization % on a virtual machine (VM) 322
Initial correlation 708==CPU utilization >90% on at least ten VMs 322
Initiate a start 508 state trigger event 304 here
Start collecting 508 extended forensic data 132==Security Event 4688 (indicating a new process has been created) across a broader cluster of a hundred VMs 322
Stop state trigger could be==If now the CPU utilization drops back to 50% on the set of at least ten VMs (looking at basic data 130, not extended data 132) then initiate stop 514 state trigger event 406 here In some cases, basic status data 130 can be both the cause of the start state and the cause of the stop state. An example scenario includes the following sequence:

- Status data==Security Event ID 4688 on a VM
- Initial correlation==If a new process is seen for the first time on 1 VM (out of 100 VMs)
- Initiate a start state trigger event here
- Start collecting extended forensic data ETW EID 12 (Attempted connection) and ETW EID 15 (Established connection)
- Stop state trigger could be ==If the new process is now seen on all 100 VMs In some cases, basic status data 130 causes the start state and extended status data 132 causes the stop state. An example scenario includes the following sequence:

- Status data==Security Event ID 4688 on a VM
- Initial correlation==If a new process is seen for the first time on 1 VM (out of 100 VMs)
- Initiate a start state trigger event here
- Start collecting extended forensic data ETW EID 12 (Attempted connection) and ETW EID 15 (Established connection)
- Stop state trigger could be == If ETW EID 12 shows that the process is attempting to connect to a rarely seen port number (e.g., something random like 52149) but ETW EID 15 shows connections were never successfully established One of skill will understand that many other examples are also within the scope of the present teachings. For instance, extended data could include TCP packet send events, TCP packet receive events, metadata from packet headers, data from packet bodies. In some embodiments or configurations, extended status data is more voluminous than basic status data. Accordingly, extended status data is not routinely collected.

In some embodiments, starting 508 the forensic capture of extended status data of the monitored computing system includes requesting 510 extended status data from multiple virtual machines 322 of the monitored computing system 218.

In some embodiments, the method includes forensically capturing 210 the extended status data, and the forensically captured extended status data 132 consists by size 426 mostly of data 324 captured from within one or more virtual machines 322 of the monitored computing system.

In some embodiments, the method includes at least one of: enabling 602 a forensic capture rule 310 in response to detecting 504 the trigger event 304, or disabling 604 a forensic capture rule 310 in response to detecting 512 the stop event 406.

In some embodiments, the stop event 406 is a no-anomaly-found event 416.

In some embodiments, the method includes avoiding 606 purging 608 the captured extended status data 132 for at least a predefined period of time 312.

In some embodiments, the method includes avoiding 610 transmitting 612 the captured extended status data 132 outside a specified regulatory compliance boundary 320.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as event-triggered forensic capture software 302, trigger event specifications 402, capture event specifications 404, stop event specifications 408, queries 318, and virtual machines 322, in the form of data 118 and instructions 116, read from a removable storage medium 114 and/or another source such as a network connection, to form a configured storage medium. The configured storage medium 112 is capable of causing a computer system 102 to perform technical process steps for event-triggered forensic capture, as disclosed herein. The Figures thus help illustrate configured storage media embodiments and process (a.k.a. method) embodiments, as well as system and process embodiments. In particular, any of the process steps illustrated in FIGS. 5 through 7, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a forensic computing system to perform a method 600 for event-triggered forensic capture. This method includes: receiving 502 basic status data of a monitored computing system which includes multiple machines outside the forensic computing system; detecting 504 a trigger event in the basic status data, the trigger event matching a trigger event specification; in response to detecting the trigger event, starting 508 a forensic capture of extended status data of the monitored computing system, the extended status data including data which is not present in the basic status data and which matches 616 a capture specification that is associated with the trigger event specification; forensically capturing 210 the extended status data; detecting 512 a stop event, the stop event matching 616 a predefined stop event specification; in response to detecting 512 the stop event, stopping 514 the forensic capture of extended status data of the monitored computing system without 618 stopping an ongoing receipt of basic status data; and submitting 516 at least a portion of the extended status data to a forensic analysis tool.

In some embodiments, the captured extended status data 132 includes at least one of the following: indicators of compromise data 420; or alerts data 422.

In some embodiments, the trigger event 304 includes receipt 614 of a user command 424 to start the forensic capture.

In some embodiments, the method includes avoiding 610 transmitting the extended status data outside a specified regulatory compliance boundary.

In some embodiments, a receipt rate 410 of extended status data 132 is at least five times a receipt rate 410 of basic status data 130 over a given time period of the forensic capture 210.

Additional Observations

Additional support for the discussion of event-triggered forensic capture functionality 206 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some event-triggered forensic capture embodiments provide or utilize automated event trigger-based network forensics at hyperscale (i.e., utilizing data 208 from ten or more machines 101). In some embodiments or configurations, a trigger event is a condition based on multiple machines and is not recognized on the basis of any given one of those machines, e.g., traffic to a particular IP address or IP address range. In one scenario, a node 101 does not recognize the particular IP address as malicious, but then the enhanced system 202 learns (e.g., via a threat feed or correlation result) that the particular IP address is malicious, or is otherwise an indicator of compromise. That learning could be a trigger event, or additional conditions could be part of the trigger, e.g., at least ten percent of the monitored system 218 nodes 101 communicate with the particular IP address.

One of skill informed by the present disclosure would acknowledge that some large enterprises, telecommunication companies, and cloud providers struggle to fully monitor their networks, given the scale of deployment. Although network 108 data 118 is often a useful telemetry source 702, especially in times of threat hunting or during a live investigation, given the range of network telemetry 208 available it is often very challenging to define at inception a narrow set of parameters for practical logging and monitoring purposes.

Instead of requiring organizations to log, process, and monitor all network telemetry 208, some embodiments described herein recognize an initiating event 304 that can be pre-defined by the user, which will trigger a forensic capture to run 508 and archive 620 the data in cold and cost-optimized storage 706, until a closing event 406 (or manual user intervention 614) is triggered to stop 514 the forensic capture. When an initiating event 304 of interest occurs, some embodiments start an immediate forensic capture that could differ from scenario to scenario per paired specifications 402 and 404. The precise amount of visibility required by the user is specified, e.g., by collection rules 310 or another capture definition 404. Specified 404 data 208 is then captured 210 until a closing event 406 occurs indicating that the more comprehensive logging is no longer required or requested.

Users can accordingly have the flexibility to define 404 which set of parameters or artifacts would be useful per scenario. In one scenario PCAP or other packet capture (a.k.a. network packet capture) might be most helpful, whereas in another scenario process memory dumps may be the most relevant data, for example. To anticipate and support a security analyst's pivoting workflow, an embodiment may get additional data on the fly and on an as-needed basis, e.g., to validate an initial hypothesis about a threat or a vulnerability. Incident analysis 308 can then use this data to test the hypothesis.

Some embodiments provide or utilize an event trigger-based approach to forensics to achieve scalability and uncompromised visibility. This differs from approaches that try to log everything, or that attempt to reduce storage and processing burdens by logging only sampled data. A log-everything approach may provide full visibility into the network, but the visibility is at the cost of logging infrastructure deployment overheads, log data management and costs, and performance impact on systems due to heavy logging. A sampled logging approach may reduce the operational, data, and performance concerns associated with a log-everything approach, but sampled logging means compromised visibility. Due to the sampling, and selective logging of parameters, only a subset of the data is stored and processed, and it may well not be the most helpful data in a given investigation later.

By contrast, embodiments taught herein allows the user to define forensic capture based on a variety of scenarios, with flexibility as to the initiating event, the forensic capture and hence the precise visibility, and the closing event. This approach helps provide uncompromised visibility in a scalable and practical implementation model.

FIG. 7 illustrates one suitable forensic capture architecture. A data source 702 may include, e.g., virtual machines 322, servers 102, and logging agents or scripts. During a step A data 208 is logged into a store 704, a log analytics store 112 or a SIEM store 112. During a step B data 208 is transmitted from the store 704 to ongoing correlation logic 708, e.g., a correlation engine 220. The correlation logic 708 receives 502 basic status data 130, 208 and detects 504 a trigger event 304. During a step C the trigger event is sent to software 302, or used by software 302, to enter a capture state 710 according to which the corresponding extended data 132 will be captured 210.

In this example, step D starts 508 the capture by enabling 602 a forensic capture collection rule 310 that implements the capture specification 404 at the data source 702. As a result, in step E forensic data 208 including extended data 132 is captured into the extended data store 706. Data store 706 may include, e.g., so-called big data store in a SIEM log store or a data analytics service.

In this example, steps F and G illustrate two paths for ending 514 the extended data 132 capture. Step F could be taken, e.g., when a collection condition 412 changes, resulting in a stop event 406 from the correlation logic 708, or when a timeout event 414 is generated by software 302 in the correlation logic 708. Step G could be taken, e.g., after analysis by a tool 122 or security personnel leads to a no-anomaly-found event 416.

From state 712, path H stops 514 the capture by disabling 604 the forensic capture collection rule 310 that implemented the capture specification 404 at the data source 702 per step D. This termination of forensic data capture is indicated at location step J in FIG. 7.

Some embodiments provide or utilize real-time on-demand forensics. Initial clues for an investigation are made available in non-intrusive way by installing agents 302 on demand during the investigation. Hunters can then use various remote-control features. One feature is a self-service experience of real-time query language (e.g., KQL, SQL, or another language 316) queries 318 on streams 418. Investigators and threat hunters can use this feature to define a query 318 on any live-stream available on the agent. One example is Event Tracing for Windows (ETW), to allow usage of any provider and Event IDs. Another example is using Windows Management Instrumentation (WMI) and log events in real-time. On Linux, a similar feature may be based on Berkeley Packet Filter (BPF).

Another feature supports a read-only query 318 on artifacts 324 on the VMs 322. For example, an embodiment may support a query for the system 218 of many VMs, as if all the local VM data 324 was in a log analytics service. But the data 208 is not necessarily uploaded; it may exist only in VM memory or on VM disks of the source VMs. For example, one might search 318 for files matching a name pattern or a hash sum. One might query 318 all the registry and other in-memory API structures 324, without needing to know details of native APIs and file formats.

Another feature supports downloading of artifacts 324, such as specific files on disk, logs, registry hives, and process memory dumps.

Another feature supports network payload capture 210. Threat hunters and incident investigators may configure local recording of PCAP files 208. These files can be grabbed from the VM and opened in a suitable tool 222.

Another feature supports data storage 306 and transmission only within a compliance boundary 320.

One of skill informed by the teachings herein will acknowledge various technical benefits of embodiments. For example, some embodiments detect 504 a trigger event in the basic status data, start 508 a forensic capture of extended status data from the monitored computing system, and submit 516 at least a portion of the extended status data to a forensic analysis tool. By only capturing data when it is likely to be relevant, this reduces data storage and processing while also reducing and controlling a risk that data helpful to the investigation of a security incident will be unavailable.

In some embodiments, the forensic specification 216 includes multiple trigger event specifications and multiple corresponding capture specifications, and at least two of the capture specifications specify different extended status data than each other. This permits the embodiment to capture different kinds of data for different trigger events, thereby capturing the most relevant data per the paired specifications 402 and 404.

In some embodiments, the stop event is a no-anomaly-found event 416. This permits the embodiment to stop capturing data 208 after investigation finds no security incident, thereby reducing data storage and processing.

In some embodiments, the stop event is a change 428 in the basic status data 130. This permits the embodiment to stop capturing data 208 after the apparent need for the forensic capture falls below a threshold or otherwise ends, thereby reducing data storage and processing.

Other benefits of particular embodiments will also be apparent.

Technical Character

The technical character of embodiments described herein will be apparent to one of ordinary skill in the art, and will also be apparent in several ways to a wide range of attentive readers. Some embodiments address technical activities such as detecting 504 or 512 or 210 particular computing system events 214 based on a forensic specification 216, transmitting 612 captured forensic data 208, purging captured forensic data 208, and correlating 708 forensic data 208, which are each an activity deeply rooted in computing technology. Some of the technical mechanisms discussed include, e.g., forensics software 302, forensic specifications 216, correlation engines 220, forensic analysis tools 222, and various interfaces 124, 326. Some of the technical effects discussed include, e.g., capture 210 of specified 404 extended status data 132 based one defined trigger events 304, reduction of performance and management overheads from logging, reduction of data storage costs, and automated tailoring of forensic capture to relevant data 208. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to capture helpful forensic data and avoid capturing forensic data that is unlikely to be helpful during an analysis 308. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPS: global positioning system GPU: graphical processing unit
GUI: graphical user interface
HTTPS: hypertext transfer protocol, secure
IaaS or IAAS: infrastructure-as-a-service
ID: identification or identity
LAN: local area network
MAC address: media access control address
OS: operating system
PaaS or PAAS: platform-as-a-service
RAM: random access memory
ROM: read only memory
SIEM: security information and event management, or tool for the same
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"IoT" or "Internet of Things" means any networked collection of addressable embedded computing or data generation or actuator nodes. An individual node is referred to as an internet of things device 218 or IoT device 218. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Forensic capture operations such as matching 616 events 214 to specifications 216, capturing 210 forensic data 208, and many other operations discussed herein, are understood to be inherently digital. A human mind cannot interface directly with a CPU or other processor, or with RAM or other digital storage, to read and write the necessary data to perform the event-triggered forensic capture 600 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac gadget" and that claim limitation became subject to means-plus-function interpretation, then at a minimum all structures identified anywhere in the specification in any figure block, paragraph, or example mentioning "zac gadget", or tied together by any reference numeral assigned to a zac gadget, or disclosed as having a functional relationship with the structure or operation of a zac gadget, would be deemed part of the structures identified in the application for zac gadget and would help define the set of equivalents for zac gadget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as analyzing, capturing, detecting, disabling, enabling, getting, matching, purging, querying, receiving, requesting, specifying, starting, stopping, storing, submitting, transmitting, triggering (and analyzes, analyzed, captures, captured, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

List of Reference Numerals

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node"
104 users, e.g., user of an enhanced system 202; refers to a human or a human's online identity unless otherwise stated
106 peripheral device
108 network generally, including, e.g., LANs, WANs, software-defined networks, clouds, and other wired or wireless networks
110 processor; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102
120 kernel(s), e.g., operating system(s), BIOS, UEFI, device drivers
122 tools, e.g., version control systems, cybersecurity tools, software development tools, office productivity tools, social media tools, diagnostics, browsers, games, email and other communication tools, commands, and so on
124 user interface; hardware and software
126 display screens, also referred to as "displays"
128 computing hardware not otherwise associated with a reference number 106, 108, 110, 112, 114
130 basic status data, also referred to a basic data; digital; may vary between implementations or configurations, but includes the data 208 which is collected 210 on an ongoing or continuous basis, as opposed to extended status data 132
132 extended status data whose collection 210 is triggered by a particular previously collected trigger event 214 per a mapping such as the pairing of two specifications 402 and 404; digital; also referred to as extended data
134 cloud, cloud computing environment
202 system 102 enhanced with event-triggered forensic capture functionality 206
204 forensic, e.g., security-related or privacy-related, useful in security investigation, security compliance, privacy compliance, or related mechanisms or data or controls
206 functionality for event-triggered forensic capture; may also referred to as event-triggered forensic capture functionality 206; e.g., software or specialized hardware which performs or is configured to perform steps 504, 508, 512, and 514, or any software or hardware which performs or is configured to perform a method 600 or a computational forensic activity first disclosed herein
208 forensic data 118; examples include basic data 130 and extended data 132; also referred to as status data or telemetry or incident data
210 computational activity of capturing or collecting forensic data, or a result thereof, e.g., logging, or packet capture, or getting 506 data 324
212 computational activity of triggering capture of extended data 132, or an event 214 which upon detection leads to such activity
214 event in a computing system; digital; any data structure representing an action or a status in the computing system; includes forensic data 208 as well as data that does not implicate security
216 forensic specification data structure; digital
218 monitored computing system; an example of a system 102, which is subject to monitoring by a forensic system 202
220 correlation engine; a system 102 which is configured to correlate forensic data with other forensic data or with capture rules or specifications 216 or forensic tools or look for indicators of compromise, threats, or vulnerabilities
222 forensic analysis tool, also referred to as forensic tool; computational; may include, e.g., disk analysis tools, memory examination tools, registry analysis tools, mobile device analysis tools, network analysis tools, packet analysis tools, cryptographic tools, database analysis tools, file analysis tools
302 forensic capture software
304 capture start trigger event; digital
306 captured data storage; includes hardware 112; includes or is accessed via an API or other interface
308 forensic analysis, as represented or performed computationally in a computing system; e.g., computationally analyze data 208 in a tool 222 or via a tool 222
310 capture rule, e.g., which instructs a logger or logging agent whether to log certain events; may be data structure or be implemented computationally
312 time period as represented or performed computationally in a computing system; may be a point in time or an interval or multiple intervals
314 anomaly, as represented or identified computationally in a computing system; may represent a vulnerability or a threat, for example
316 query language, e.g., Kusto Query Language (KQL), Structured Query Language (SQL) or another language suitable for managing data, or for searching data in a database or stream
318 query in a query language; digital
320 compliance boundary as represented or identified computationally in a computing system, e.g., the geographic area subject to GDPR corresponds to a compliance boundary
322 virtual machine; computational
324 data within a virtual machine's allocated memory (working or disk or both); an example of memory 112 configured by data structures, code, and other artifacts
326 interface generally; computational
402 start capture event specification; digital; "trigger event" refers to a start capture event if not otherwise indicated
404 captured event(s) specification; digital
406 stop event; digital
408 stop capture event specification; digital
410 event receipt rate, as represented or identified computationally in a computing system
412 event collection condition, as represented or identified computationally in a computing system
414 timeout event; digital
416 no-anomaly-found event; digital
418 data stream, e.g., event stream, as represented or identified computationally in a computing system
data which serves or is defined as an indicator of compromise; digital
422 alert data; digital
424 user command as represented or identified computationally in a computing system
426 size, e.g., in bytes, of data 118

428 event collection condition change, as represented or identified computationally in a computing system; also refers to change in events received 502

500 flowchart; 500 also refers to event-triggered forensic capture methods that are illustrated by or consistent with the FIG. 5 flowchart 502 computationally receive basic data 130

504 computationally detect a start 508 trigger event 506 computationally receive a query 318, e.g., via a user interface 508 computationally start capture of extended data 132

510 computationally request data 324, 208 from a virtual machine 512 computationally detect a stop 514 trigger event 514 computationally stop capture of extended data 132

516 computationally submit data 208 to a tool 222

600 flowchart; 600 also refers to event-triggered forensic capture methods that are illustrated by or consistent with the FIG. 6 flowchart, which incorporates the steps of the FIG. 5 flowchart and the FIG. 7 data flow diagram 602 computationally enable a capture rule 310, e.g., via an API 604 computationally disable a capture rule 310, e.g., via an API 606 computationally avoid purging 608 captured data 208, e.g., by displaying a warning or error message in response to an attempted purge, or by setting access restrictions to hinder purging 608 computationally purge 608 captured data 208, e.g., by marking the storage space occupied by that data as available for overwriting 610 computationally avoid transmitting 612 captured data 208 outside a compliance boundary, e.g., by displaying a warning or error message in response to an attempted transmittal that would cross the compliance boundary, or by setting access restrictions to such transmittal 612 computationally transmit 612 captured data 208, e.g., via an API, file transfer, replication, email, or network communication 614 computationally receive a user command, e.g., via a user interface 616 computationally match an event to a specification, e.g., by use of a regular expression, parser, or other pattern matching mechanism 618 computationally avoid stopping capture 210 of particular data 208, e.g., by displaying a warning or error message in response to an attempted stop 620 computationally archive data 208, e.g., by placing it in non-volatile memory 112

622 any step discussed in the present disclosure that has not been assigned some other reference numeral; 622 may thus be shown expressly as a reference numeral for various steps, and may be added as a reference numeral for various steps without thereby adding new matter to the present disclosure 702 source of data 208; computational or digital as opposed to human 704 basic data store 306; may be configured, e.g., as a queryable data store, e.g., as a database 706 extended data store 306; may be configured, e.g., as an inexpensive data store relative to the basic data store expense, e.g., as an archive format such as tape 708 mechanism or activity of data 208 correlation, e.g., scanning and parsing data to identify events of interest; computational 710 computational state or code indicating that start trigger event has been identified 712 computational state or code indicating that stop trigger event has been identified Steps A-J (except I) in FIG. 7 are computational steps or states in an example dataflow architecture; to avoid confusion the letter "I" is skipped over in this list of labels Conclusion In short, the teachings herein provide a variety of event-triggered forensic capture functionalities 206 which operate in enhanced systems 202. In some embodiments, event-triggered forensics capture technologies 206 balance security incident data 208 availability against data processing and storage costs. A forensic correlation engine 220 receives 502 basic status data 130 of a monitored computing system 218. A forensic computing system 202 detects 504 a start trigger event 304 in the basic status data 130, and starts 508 capturing 210 extended status data 132 per a corresponding capture specification 404. Captured data 132, 208 is submitted 516 to a forensic analysis tool 222. Different trigger events 304 may cause different data 132 captures 210. A query 318 specifying 404 which data 208, 132 to capture 210 from a live stream 418 or from virtual machines 322 may operate as a capture trigger start event 304. Extended status data 132 capture activity 210 may be stopped 514 by a change 428 in the basic status data 130 being received 502, by a timeout 414, or by forensic analysis 308 that finds no vulnerability 416 or threat 416 based on captured data 208. Data transfers 612 and storage 620 may be restricted 610 to comply with privacy regulations 320 or policies 320.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A forensic computing system which is configured to perform event-triggered forensics capture, the forensic computing system comprising:
   a digital data store;
   a correlation engine interface to a correlation engine, the correlation engine interface configured to receive basic status data of a monitored computing system which is at least partially external to the forensic computing system; and a forensic specification including a trigger event specification and a capture specification;

wherein the forensic computing system is configured to perform event-triggered forensics capture including: (a) detecting a trigger event in the basic status data, the trigger event matching the trigger event specification, (b) in response to detecting the trigger event, starting a forensic capture of extended status data from the monitored computing system, the extended status data including data which is not present in the basic status data and which matches the capture specification, and (c) submitting at least a portion of the extended status data to a forensic analysis tool, and wherein the submitting avoids transmitting the extended status data outside a specified regulatory compliance boundary.

2. The forensic computing system of claim 1, wherein the data store includes a basic status data store and an extended status data store.

3. The forensic computing system of claim 1, wherein the forensic specification also includes a stop event specification, and the forensic computing system is configured to detect a stop event which matches the stop event specification, and in response to detecting the stop event, stopping the forensic capture of extended status data from the monitored computing system.

4. The forensic computing system of claim 1, wherein a receipt rate of extended status data is at least ten times a receipt rate of basic status data over a given time period of the forensic capture.

5. The forensic computing system of claim 1, wherein the forensic specification includes multiple trigger event specifications and multiple corresponding capture specifications, and wherein at least two of the capture specifications specify different extended status data than each other.

6. A method for event-triggered forensics capture, the method performed by a forensic computing system, the method comprising:

receiving basic status data of a monitored computing system which includes multiple machines outside the forensic computing system;

detecting a trigger event in the basic status data, the trigger event matching at least one of a first trigger event specification or a second trigger event specification;

in response to detecting the trigger event, starting a forensic capture of extended status data of the monitored computing system, the extended status data including data which is not present in the basic status data and which matches at least one of a first capture specification that is associated with the first trigger event specification or a second capture specification that is associated with the second trigger event specification, wherein the first capture specification and the second capture specification specify different respective extended status data than each other;

detecting a stop event, the stop event matching a predefined stop event specification;

in response to detecting the stop event, stopping the forensic capture of extended status data of the monitored computing system without stopping an ongoing receipt of basic status data; and submitting at least a portion of the extended status data to a forensic analysis tool.

7. The method of claim 6, further comprising the forensic computing system getting a query in a query language, the query including the trigger event specification and the query including the capture specification.

8. The method of claim 6, wherein the stop event is a timeout event.

9. The method of claim 6, wherein the stop event includes a change in whether the basic status data satisfies a collection condition.

10. The method of claim 6, wherein starting the forensic capture of extended status data of the monitored computing system includes requesting extended status data from multiple virtual machines of the monitored computing system.

11. The method of claim 6, further comprising forensically capturing the extended status data, and wherein the forensically captured extended status data consists by size mostly of data captured from within one or more virtual machines of the monitored computing system.

12. The method of claim 6, further comprising at least one of: enabling a forensic capture rule in response to detecting the trigger event, or disabling a forensic capture rule in response to detecting the stop event.

13. The method of claim 6, wherein the stop event is a no-anomaly-found event.

14. The method of claim 6, wherein receiving the basic status data of the monitored computing system includes receiving the basic status data from a real-time stream.

15. The method of claim 6, further comprising at least one of the following:

avoiding purging the captured extended status data for at least a predefined period of time; or avoiding transmitting the captured extended status data outside a specified regulatory compliance boundary.

16. A computer-readable storage device configured with data and instructions which upon execution by a processor cause a forensic computing system to perform a method for event-triggered forensics capture, the method comprising:

receiving basic status data of a monitored computing system which includes multiple machines outside the forensic computing system;

detecting a trigger event in the basic status data, the trigger event matching a trigger event specification;

in response to detecting the trigger event, starting a forensic capture of extended status data of the monitored computing system, the extended status data including data which is not present in the basic status data and which matches a capture specification that is associated with the trigger event specification;

forensically capturing the extended status data;

detecting a stop event, the stop event matching a predefined stop event specification, wherein the stop event includes a change in whether the basic status data satisfies a collection condition;

in response to detecting the stop event, stopping the forensic capture of extended status data of the monitored computing system without stopping an ongoing receipt of basic status data; and submitting at least a portion of the extended status data to a forensic analysis tool.

17. The computer-readable storage device of claim 16, wherein the captured extended status data includes at least one of the following:

indicators of compromise data; or alerts data.

18. The computer-readable storage device of claim 16, wherein the trigger event includes receipt of a user command to start the forensic capture.

19. The computer-readable storage device of claim 16, wherein the method comprises avoiding transmitting the extended status data outside a specified regulatory compliance boundary.

20. The computer-readable storage device of claim 16, wherein a receipt rate of extended status data is at least five times a receipt rate of basic status data over a given time period of the forensic capture.

\* \* \* \* \*